United States Patent [19]

Riihimäki et al.

[11] Patent Number: 4,490,615

[45] Date of Patent: Dec. 25, 1984

[54] X-RAY INTENSIFYING SCREEN

[75] Inventors: Esko Riihimäki, Espoo; Ossi Korhola, Helsinki, both of Finland

[73] Assignee: Radiographic Screen Oy, Finland

[21] Appl. No.: 316,741

[22] Filed: Oct. 30, 1981

[51] Int. Cl.[3] .................. G01J 1/58

[52] U.S. Cl. .................. 250/487.1; 250/483.1

[58] Field of Search .................. 250/483.1, 486.1, 487.1

[56] References Cited

U.S. PATENT DOCUMENTS

| | | | |
|---|---|---|---|
| 2,648,013 | 8/1953 | Smith . | |
| 2,882,413 | 4/1959 | Vingerhoets . | |
| 3,344,276 | 9/1967 | Balding | 250/486.1 |
| 3,584,216 | 6/1971 | Tinney | 250/483.1 |
| 3,958,970 | 5/1976 | Auzel | 250/487.1 |
| 4,023,039 | 5/1977 | Galves et al. | 250/486.1 |
| 4,259,587 | 3/1981 | Takahashi et al. | 250/486.1 |
| 4,362,946 | 12/1982 | Cusano et al. | 250/483.1 |

FOREIGN PATENT DOCUMENTS 1080641 8/1967 United Kingdom .

*Primary Examiner*—Bruce C. Anderson
*Attorney, Agent, or Firm*—McGlew and Tuttle

[57] ABSTRACT

An X-ray intensifying screen is disclosed which is made of material that transforms X-rays into light and a suitable binding agent, the screen comprising a screen member having a surface with a plurality of spaced recesses for channelling the light toward specific areas of the film and to prevent uncontrolled diffusion and scattering of the light generated by the X-rays.

2 Claims, 7 Drawing Figures

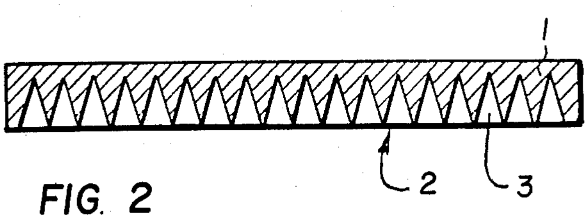
FIG. 2
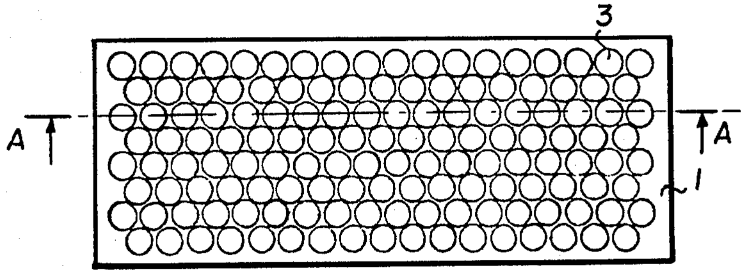
FIG. 1
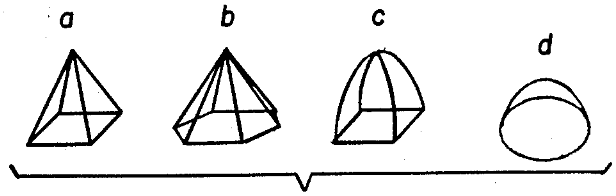
FIG. 3
FIG. 4
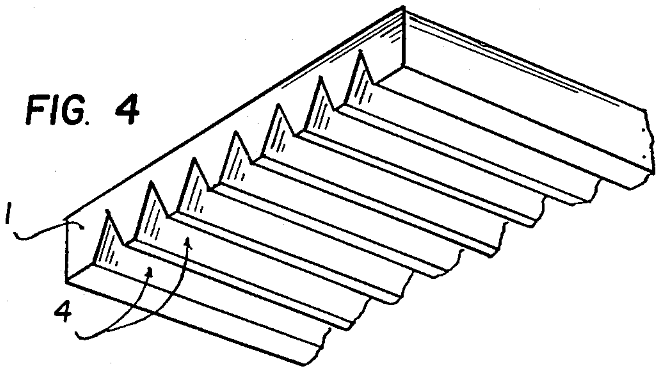

X-RAY INTENSIFYING SCREEN

FIELD AND BACKGROUND OF THE INVENTION

The present invention relates to an X-ray intensifying screen made of a material for transforming X-rays into light and of a suitable binding agent therefor.

In X-ray imaging it is customary to employ intensifying screens on one or both sides of the X-ray film. The purpose of the screens is to transform the X-ray quanta into light quanta, for which the X-ray film is most sensitive. The materials used in intensifying screens do not, however, fully transmit the light emitted by them. If the screen is made thick, the intensifying material absorbs the created light. Thus only a thin layer of the intensifying screen can be utilized.

Presently the common intensifying material is a radiation-absorbing and light-emitting material, i.e. luminescent material, which is applied as a thin layer on the surface of a suitable base material. The intensifying screen formed in such a fashion can also be protected with a suitable film or coating.

Although the intensifying screen is an essential component in medical X-ray imaging, two factors make it a weak link in the chain of information transmission which comprises the total image formation process. Firstly, the screens fail to use a large proportion of the available information carrying X-ray quanta by not absorbing the quanta at all. Secondly, the positional information of the absorbed quanta is diminished by the fact that light spreads in the screen through diffusion. This means that the information on the position of the X-ray quantum absorption becomes less precise due to the statistical nature of the diffusion of the finite number of light quanta created. These two factors are strongly interrelated in conventional flat intensifying screens in the sense that improvement in one means deterioration in the other. Furthermore, not even the absorbed quanta are registered equally on the film. Those near the film surface contribute most to the blackening of the film whereas the quanta absorbed at a distance have less influence on the blackening. This phenomenon is most pronounced in thick screens and reduces the average contribution of the absorbed quanta to light output. Information in X-ray imaging is transmitted by X-ray quanta incident on the screen-film system. The information transmission capacity of the system depends on the ability of the system to register the X-rays on the film. The blackening corresponding to each quantum should be equal to ensure maximum information transmission. The maximum amount of blackening is not important in this respect, since the sensitivity of the film can easily be adjusted. To elaborate further, if the variation in light output corresponding to quanta absorbed at different depths is large, the uncertainty in the actual number of quanta giving rise to a given blackening of the film increases. For example, a given blackening could be due to one quantum absorbed at the film surface of the screen or 10 quanta absorbed at the far surface of the screen. This uncertainty, which reduces the information transmission, is most pronounced at the low quantum densities typical of rare earth screens.

An X-ray intensifying screen is known in the art and disclosed in the German Offenlegungschrift-publication No. 2 010 780, wherein the luminescent material is divided into smaller areas and these areas are separated by metal slits. By making these areas sufficiently small, the light quanta diffusion and hence the image quality can be somewhat improved. Despite that, this screen has the same drawbacks as described above. Moreover, the intensifying screen presented in this German publication becomes expensive to manufature.

SUMMARY OF THE INVENTION

The purpose of the present invention is to avoid the above mentioned drawbacks and to realize a new-type intensifying screen which is easy to manufacture. Accordingly, an object of the invention is to provide an X-Ray intensifying screen made of material which transforms X-Rays into light and a suitable binding agent, the screen comprising a screen member having a surface adapted to face X-Ray film to be exposed which surface includes a plurality of spaced recesses.

Among the most important advantages of the invention, the following can be pointed out. Owing to the structure of the intensifying screen, its efficiency becomes manifold compared to an equivalent flat intensifying screen. Hence the X-ray imaging can be carried out with a smaller radiation dose. This is naturally a remarkable advantage for the patient. On the other hand, the spatial resolution of the screen is maintained within acceptable limits, and the sharpness of the image remains reasonably good.

BRIEF DESCRIPTION OF THE DRAWINGS

In the following the invention is described in detail with reference to the appended drawings wherein:

FIG. 1 is a plan view of one preferred embodiment of the intensifying screen of the invention seen from above;

FIG. 2 is a cross-sectional view of the intensifying screen of FIG. 1 taken along the line A—A;

FIG. 3 shows various possibilities for the shape of the apertures or recesses made in the screen of the invention;

FIG. 4 is a perspective view illustration of an intensifying screen provided with grooves;

DESCRIPTION OF THE PREFERRED EMBODIMENTS

Figure 5:
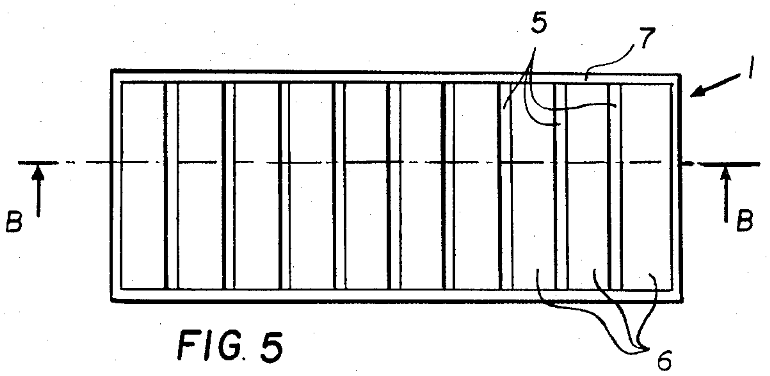
FIG. 5 is a plan view of another advantageous application of the intensifying screen seen from above.

The intensifying screen 1 presented in FIGS. 1 and 2 is made of a material consisting of a binding agent and a luminescent material mixed evenly together. As the luminescent material it is advantageous to use calcium tungstate, barium, or phosphors containing rare earth metals. As binding agents, polyethylene, silicone compound, acrylic plastic, teflon or cast plastics can be employed.

In order to make the mixture of the luminescent material and the binding agent as homogenic as possible, the luminescent material is powdered and mixed with the binding agent in a pulverous form. According to FIGS. 1 and 2, on the surface 2 of the intensifying screen 1 there are formed conical apertures or recesses 3 at regular distances. The screen 1 is meant to be employed so that the side provided with the holes 3 is placed against the film.

FIG. 3 presents various examples of different forms of the recesses. They can have the form of circled cones (FIG. 1 and 2), polygon-based cones FIG. 3 at a and b or circular or polygon-based cones with arched surfaces c and d. The shape of the recesses can be chosen relatively freely, for example according to production-technical requirements, but it is advantageous that the holes converge towards the inside of the screen, seen from the side against which the X-ray film is to be placed.

FIG. 4 shows another embodiment of the intensifying screen in the invention. In this case on the surface of the screen 1 are, instead of separate apertures, engraved several parallel, equidistant grooves 4, which grooves can be either straight or curved.

Figure 6:
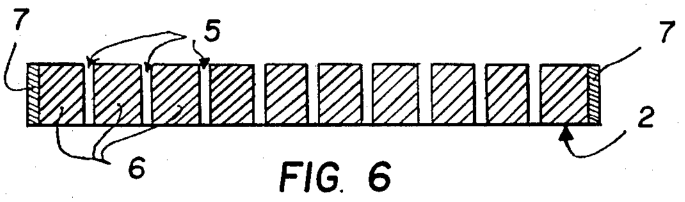
FIG. 6 is a cross-sectional view taken along the line B—B of the intensifying screen of FIG. 5.

The recesses 3 or grooves 4 can also reach right through the screen. In the preferred embodiment illustrated in FIGS. 5 and 6, the gaps 5 are parallel and equally wide, and placed preferably at regular distances from each other, vertically towards the screen plane, and run along the length of the screen. Such an intensifying screen 1 can be manufactured for example of a bundle of parallel luminescent material and binding material fibers 6, which fibers are located in a suitable frame 7. Sufficient air gaps 5 are left between the fibers.

Figure 7:
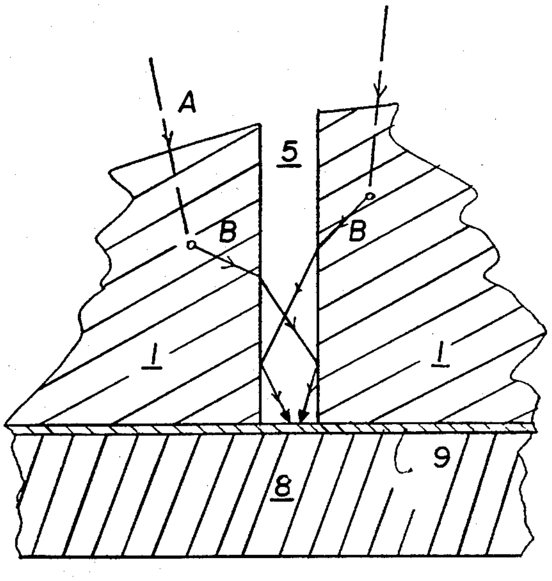
FIG. 7 is an explanatory view which demonstrates the operation of any one of the screens according to the invention.

The operation of the intensifying screen according to the invention is explained with reference to FIG. 7. the X-ray quanta A are absorbed into the luminescent material, which further emits a finite amount of X-ray quanta towards different directions B. Part of the light falls into the recesses or gaps 5, which gaps function as light conductors reflecting and guiding the light further onto the light-sensitive film 9 of the X-ray imaging screen, so that the film 9 is on a backing 8 and is exposed. Simultaneously the material located between the recesses or gaps absorbs light, so that the spreading or diffusion of light at the X-ray absorption point does not go beyond the nearest recesses or gaps.

The spatial distribution capacity of the intensifying screen 1 remains fairly good partly owing to the absorption capacity of the screen material and partly owing to the light-conducting capacity of the recesses or gaps located in the screen 1. Hence the quality of the image also remains comparatively good. The intensifying screen can be made fairly thick owing to the light-conducting recesses or gaps, in which case the informational efficiency of the X-ray quanta grows manifold compared to conventional intensifying screens.

In practice the thickness of the intensifying screen of the invention varies generally between 0.1–4.00 mm and the diameter of the recesses 3 and the grooves 4 or equivalent between 0.01–0.5 mm. The width of the gaps reaching through the screen varies between 0.001–0.02 mm and the interdistances of the gaps between 0.01–0.2 mm. However, it is natural that in some cases it is advantageous to manufacture screens not fitting within these dimensions. Therefore it is not desired to limit the invention within any of the numerical yield values mentioned either above or below, but the figures should be considered as advisory values only.

The intensifying screen can be manufactured so that the material transforming X-rays to light is mixed, preferably in pulverous form, with the binding agent, and this compound is pressed with a suitable mould into a screen provided with apertures of the desired shape. The screen provided with gaps is preferably manufactured for instance of fibrous material, in which case there is no need for a mould.

In the above described embodiments the recesses or gaps of then intensifying screen are filled with surrounding air. The intensifying screen 1 can be covered with a protecting plate either on the recess side only, or, in the case of gaps, on both sides. Hence, the recesses, grooves or gaps of the screen 1 can be in the manufacturing phase be filled with air or with some suitable gas, or a vacuum can be provided therein. Thus for instance impurities can be prevented from entering the recesses or gaps.

We claim:

1. An X-ray intensifying screen for transforming X-rays into light to aid in the exposure of X-ray film, consisting essentially of:

a planar screen member made of a homogeneous mixture of material which transforms X-rays into light rays and a binding agent, said screen member having a first plane surface and a second surface adapted to face the X-ray film, said second surface including a plurality of spaced shaped recesses therein adapted to be filled only with air, said recesses converging from a widest point adjacent said second surface so that the light rays are guided toward the X-ray film, said material which transforms X-rays being chosen from the group consisting of calcium tungstate, barium and phosphors containing rare earth metal, and said binding agent chosen from the group consisting of polyethylene, silicone compounds, acrylic plastic, polytetrafluoroethylene and cast plastic, the width of said screen being 0.1 to 4.00 mm and the diameter of said recesses being 0.01 to 0.5 mm.

2. An X-ray intensifying screen manufactured of a material for transforming X-rays into light and of a binding agent, consisting essentially of the intensifying screen (1) being made of a homogeneous mixture of the material and the binding agent, the screen having the surface (2) adapted to be placed against X-ray film, and having gaps (5) adapted to be filled only with air for guiding light toward the X-ray film, the material being chosen from the group consisting of calcium tungstate, barium and phosphorus containing rare earth metals, the width of the gaps (5) extending through the screen being between 0.001 and 0.02 mm.

* * * * *